US012494583B2

(12) United States Patent
Su et al.

(10) Patent No.: US 12,494,583 B2
(45) Date of Patent: Dec. 9, 2025

(54) DISTRIBUTED MONOPOLE ANTENNA FOR ENHANCED CROSS-BODY LINK

(71) Applicant: Meta Platforms Technologies, LLC, Menlo Park, CA (US)

(72) Inventors: Wenjing Su, San Jose, CA (US); Jiang Zhu, Cupertino, CA (US); Bruno Cendon Martin, Palo Alto, CA (US); Geng Ye, Union City, CA (US); Yixiang Li, Fremont, CA (US); Umar Azad, San Jose, CA (US); Prathap Valale Prasannakumar, San Jose, CA (US); Amin Tayebi, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/670,406

(22) Filed: May 21, 2024

(65) Prior Publication Data

US 2024/0372263 A1 Nov. 7, 2024

Related U.S. Application Data

(63) Continuation of application No. 17/862,993, filed on Jul. 12, 2022, now Pat. No. 12,021,319.

(Continued)

(51) Int. Cl.

| | |
|---|---|
| ***H01Q 9/30*** | (2006.01) |
| ***H01Q 5/48*** | (2015.01) |
| ***H01Q 21/08*** | (2006.01) |

(52) U.S. Cl.

CPC ................. *H01Q 9/30* (2013.01); *H01Q 5/48* (2015.01); *H01Q 21/08* (2013.01)

(58) Field of Classification Search

CPC .. H01Q 9/0407; H01Q 9/0414; H01Q 9/0421; H01Q 9/0445; H01Q 9/045;

(Continued)

(56) References Cited

U.S. PATENT DOCUMENTS 5,061,939 A * 10/1991 Nakase ................ H01Q 9/0414 343/846

6,211,824 B1 * 4/2001 Holden ................ H01Q 9/0414 343/846

(Continued)

FOREIGN PATENT DOCUMENTS

CN 112332081 A 2/2021

OTHER PUBLICATIONS

Conway G.A., et al., "Low-Profile Microstrip Patch Antenna for Over-Body Surface Communication at 2.45 GHZ," 2007 IEEE 65th Vehicular Technology Conference-VTC2007-Spring, Apr. 1, 2007, pp. 392-396.

(Continued)

*Primary Examiner* — Jason M Crawford

(74) *Attorney, Agent, or Firm* — Foley & Lardner LLP

(57) ABSTRACT

The disclosed distributed monopole antenna may include a first conductive plate and a second conductive plate. The distributed monopole antenna may also include multiple different vias that electrically connect the first conductive plate to the second conductive plate. Still further, the distributed monopole antenna may include an antenna feed electrically connected to at least one of the vias. Various other systems, methods of manufacturing, and wearable electronic devices that implement distributed monopole antennas are also disclosed.

15 Claims, 11 Drawing Sheets

Related U.S. Application Data

(60) Provisional application No. 63/332,677, filed on Apr. 19, 2022.

(58) Field of Classification Search
CPC ...... H01Q 9/30; H01Q 21/0037; H01Q 21/06; H01Q 21/061; H01Q 21/065; H01Q 21/08; H01Q 21/10; H01Q 21/12
See application file for complete search history.

(56) References Cited

U.S. PATENT DOCUMENTS 6,750,825 B1 * 6/2004 Delaveaud ............. H01Q 5/357 343/749
7,196,666 B2 * 3/2007 Allen ....................... H01Q 9/30 343/702
9,478,869 B1 * 10/2016 Zhu ...................... H01Q 9/0435
9,825,373 B1 * 11/2017 Smith ................ H01Q 21/0006
9,853,361 B2 * 12/2017 Chen .................... H01Q 9/0442
11,196,162 B2 * 12/2021 Jouanlanne ............ H01Q 5/328
12,021,319 B2 * 6/2024 Su ............................ H01Q 9/30
2005/0134522 A1 * 6/2005 Waltho ..................... H01Q 1/28 343/909
2005/0174291 A1 * 8/2005 Inatsugu ................ H01Q 21/29 343/700 MS
2008/0258978 A1 * 10/2008 Stuart .................. H01Q 19/005 343/700 MS
2012/0032865 A1 * 2/2012 Toyao .................. H01Q 15/008 343/834
2012/0242547 A1 * 9/2012 Fujii ........................ H01Q 1/38 343/700 MS
2014/0097995 A1 * 4/2014 McKinzie, III ........ H01Q 21/26 29/601
2016/0344093 A1 * 11/2016 Tagi ....................... H01Q 1/525
2016/0359232 A1 * 12/2016 Kawaguchi .......... H01Q 9/0407
2017/0085011 A1 * 3/2017 Kim ..................... H01Q 1/3233
2019/0103676 A1 * 4/2019 Sugimoto ................ H01Q 1/42
2019/0157747 A1 * 5/2019 Su ........................ H01Q 21/061
2019/0173500 A1 * 6/2019 Artemenko ............ H01Q 1/247
2019/0280375 A1 * 9/2019 Ahn .......................... H01Q 1/38
2019/0334252 A1 * 10/2019 Adams ................... H01Q 9/065
2019/0393597 A1 * 12/2019 Kosaka .................. H01Q 15/14
2020/0365994 A1 * 11/2020 Clauzier .............. H01Q 19/138
2021/0112655 A1 * 4/2021 Roy Paladhi ............ H01Q 5/10
2021/0143557 A1 * 5/2021 Patotski ................. H01Q 21/08
2021/0288409 A1 * 9/2021 Delaveaud ............... H01Q 1/48
2022/0006195 A1 * 1/2022 Ikeda ..................... H01Q 9/045
2022/0013913 A1 * 1/2022 Ikeda ........................ H01Q 1/48
2022/0393351 A1 * 12/2022 Wu ........................ H01Q 21/30
2023/0039277 A1 * 2/2023 Kakuya .................. H01Q 13/08
2023/0054657 A1 * 2/2023 Zhang .................. H01Q 15/008
2023/0101577 A1 * 3/2023 Yong ...................... H01Q 19/06 343/860
2023/0139460 A1 * 5/2023 Woo ....................... H01Q 21/28 343/702
2023/0335909 A1 * 10/2023 Su ...................... H01Q 21/0037
2023/0411856 A1 * 12/2023 Zhu .......................... H01Q 9/16
2024/0372263 A1 * 11/2024 Su .......................... H01Q 21/08

OTHER PUBLICATIONS

International Search Report and Written Opinion for International Application No. PCT/US2023/018757, mailed Jul. 31, 2023, 12 pages.

Mei P., et al., "A Low-Profile Patch Antenna with Monopole-Like Radiation Patterns," 2019 IEEE-APS Topical Conference on Antennas and Propagation in Wireless Communications (APWC), Sep. 9, 2019, 3 pages.

Sipal V., Compact and Efficient Antennas Based on Transmission Line Metamaterial Structures, Aachen, Sep. 9, 2009, 79 pages.

* cited by examiner

DISTRIBUTED MONOPOLE ANTENNA FOR ENHANCED CROSS-BODY LINK

CROSS REFERENCE TO RELATED APPLICATION

This application is a continuation of U.S. patent application Ser. No. 17/862,993, filed on Jul. 12, 2022 which claims priority to and the benefit of U.S. Provisional Patent Application No. 63/332,677, filed on Apr. 19, 2022, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
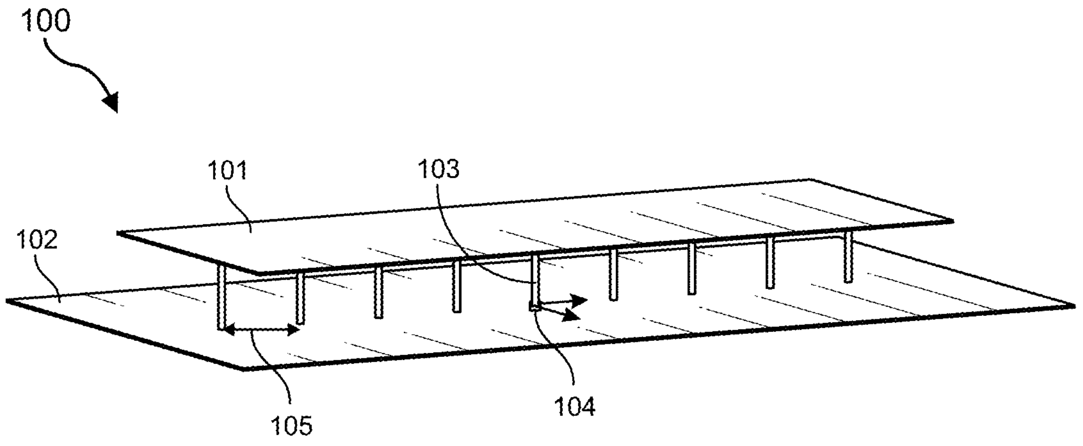
FIG. 1 is an illustration of an example embodiment of a distributed monopole antenna.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a distributed monopole antenna designed for operation in wearable electronic devices. For example, the distributed monopole antennas described herein may be implemented in head-mounted displays (HMDs), in handheld controllers, smartwatches, smartphones, or other mobile electronic devices. These distributed monopole antennas may communicate with each other by sending signals through the wearer's body. These signals are often referred to as creeping waves.

In some other embodiments, monopole antennas with an electrical field that is vertical or perpendicular to the human body (as opposed to distributed monopole antennas) may be implemented to excite creeping waves that travel along a user's body and reach controllers or other devices that may be behind or to the side of the user's body. When compared to other vertical electrical field antennas (e.g., patch antenna, Planar Inverted-F antenna (PIFA), etc.), monopole antennas may have a more evenly distributed electrical field and may have a rotationally symmetric structure. Thus, a monopole antenna may be a more robust design for maintaining a stable cross-body link. Monopole antennas, however, need to be a minimum height to function properly. For example, in order to operate at 2.4 GHz, the length of a monopole antenna would need to be 30 mm high. The length of a vertical monopole antenna designed to operate at 8.0 GHz (e.g., for ultra-wideband (UWB) channel 9) would be 10 mm. These lengths are too long for wearable electronic devices that have highly constrained form factors.

The embodiments herein, in contrast, may manufacture, produce, or otherwise provide distributed monopole antennas that may be used in wearable electronic devices. As the term is used herein, a "distributed monopole antenna" may refer to a monopole antenna that includes multiple different portions or sections that are spread over a defined area. These different sections of the distributed monopole antenna (e.g., "cells" herein) may be much shorter in length than vertical monopole antennas (e.g., 1-2 mm in length as opposed to 10-30 mm). And, even while being much shorter than vertical monopole antennas, the distributed monopole antennas herein may still serve as an optimal source for generating creeping waves in a user's body.

The distributed monopole antennas may include an antenna feed and at least two conductive plates connected by multiple vias. The combined vias and conductive plates may act together to create a distributed monopole antenna whose radiation patterns are similar to or substantially the same as vertical monopole antennas while being much shorter in height (e.g., in one case, the distributed monopole antenna may be $1/10^{th}$ the height of a monopole antenna designed to function in the same frequency range). In some embodiments, for example, the height of a distributed monopole antenna may only be 1.5 mm for operation at 8.0 GHz, and may exhibit a high efficiency at exciting creeping waves.

Various embodiments of the distributed monopole antenna are described herein. In one embodiment, a line-shaped 1×N distributed monopole antenna is provided. This antenna may include multiple vias arranged in a line. This line may be a 1×N line that is, for example, 1×3, 1×5, 1×7, etc., where N is the number of vias that connect the two radiating plates. While odd numbers are used in the examples herein, it will be understood that any odd or even number of vias may be used. Another embodiment may include four vias in a square-shaped pattern. This embodiment may include a fifth via centered within the square pattern (e.g., in a 2×2 array or in a 3×3 array, etc.). This centered via may act as or may be connected to an antenna feed.

In some cases, these distributed monopole antenna embodiments may be tuned by positioning the vias closer together or farther apart, or by changing the radiuses of the vias, or by changing the material from which the vias or the plates are made. Distributed monopole antennas that include more vias may exhibit increased bandwidth and efficiency, but may take up more space in the mobile electronic device. The embodiments herein may exhibit increased efficiency over other antennas with similar functionality (e.g., patch antennas), may experience decreased directivity, and allow more flexibility in design (e.g., 1×N or 2×N, etc.). Each of these concepts will be explained further below with regard to FIGS. 1-9 of the drawings.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates a system 100 that may include a first conductive plate 101, a second conductive plate 102, and multiple conductive vias 103 that electrically connect the first conductive plate 101 to the second conductive plate 102. The system 100 may also include an antenna feed 104 that is electrically connected to at least one of the conductive vias 103. The antenna feed may provide input signals to the system 100 or may receive signals from various components of the system. In some cases, the system 100 may be a distributed monopole antenna. The distributed monopole antenna may be implemented to transmit and/or receive electromagnetic signals at a specific frequency. In some cases, for example, a transmitting/receiving frequency may be determined for the distributed monopole antenna, and various parameters may be changed to cause the distributed monopole antenna to operate at the chosen frequency.

For instance, in some cases, the distance between vias (e.g., 105) may be made longer or shorter. Varying the distance between vias may cause the distributed monopole antenna to operate at higher or lower frequencies. Additionally or alternatively, the materials used in the conductive plates and/or in the vias may be changed. As noted above, the conductive plates 101/102 may be made from a conductive material. These conductive plates 101 and 102 may be the same size or may be different sizes. Moreover, the conductive plates 101/102 may be formed in different shapes including rectangle (as shown), square, circle, triangle, etc. The conductive plates 101 and 102 may differ in thickness or may be the same thickness. In some cases, the conductive plates may be made of copper, brass, silver, or other conductive metals or combinations of metals. In some cases, conductive foams or metalized plastics may be used to form the conductive plates 101 and/or 102. The conductive vias 103 may similarly be made of any type of conductive material including any one or more of the above-listed materials or combinations thereof. The size and length of the conductive vias 103 may also be changed in different scenarios to change operating frequency of the distributed monopole antenna.

In some embodiments, the distributed monopole antenna may be implemented in a virtual reality HMD that is wirelessly connected to one or more handheld controllers. In such cases, the user of the HMD and controllers may move the controllers into positions that are to the side of or are behind the user's body. The embodiments herein describe a distributed monopole antenna system that is adapted to provide an enhanced cross-body link. In some cases, the distributed antenna system may include multiple different vertically polarized antenna cells. These vertically polarized antenna cells may be distributed over or embedded into a substrate such as plastic or other similar materials.

Figure 2:
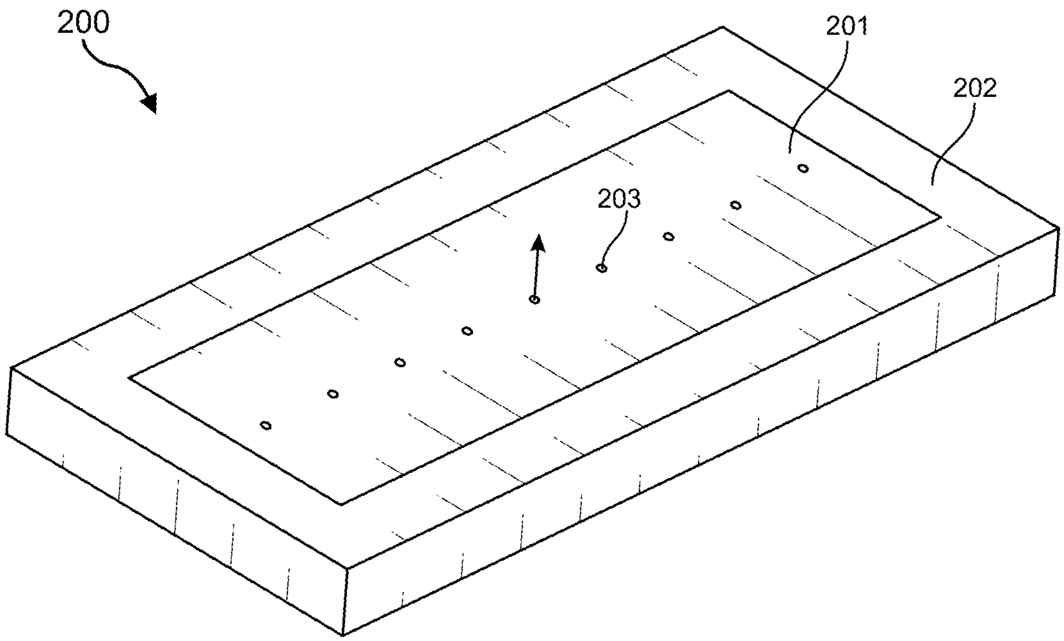
FIG. 2 is an illustration of an alternative view of an example embodiment of a distributed monopole antenna.

For instance, as shown in FIG. 2, a distributed monopole antenna 200 may include a top conductive plate 201 and a bottom conductive plate (not shown). The conductive plates may be embedded into a substrate 202 such as plastic or ceramic. The distributed monopole antenna 200 may include multiple conductive vias 203 that electrically connect the top and bottom conductive plates. In some cases, the conductive vias 203 are vertically polarized. As such, the excitation pattern may be similar to other vertically polarized monopole antennas. The height of the vias may be much lower than that of vertical monopole antennas and, in some cases, may be below a maximum specified height. In some embodiments, the distributed monopole antenna may be viewed as multiple contiguous portions or cells linked or adjoined together. These adjoined antenna cells may work as a unit to excite internal creeping waves within an individual's body and use those creeping waves to improve cross-body links between wirelessly communicating devices.

Indeed, wireless communication between wireless components that are on or near a user's body may require a robust cross-body link. The term "on-body wireless communication," as it is used herein, may refer to two or more connected devices that are close to or are attached to a user's body. The term "cross-body communication" may refer to non-line-of-sight communication between electronic components that occurs at least partially through the user's body. In these cases, the user's body may absorb at least some of the antenna's radiation, creating creeping waves. These creeping waves may travel through a user's body and onto the handheld controllers, thereby forming a cross-body link.

A robust cross-body link may overcome strong body effects that may degrade the antenna's performance. These body effects may include detuning, attenuation, and shadowing associated with the electrical properties of the user's body tissue (e.g., high permittivity and finite conductivity). In some cases, a cross-body link may overcome variations in user size or body shape, as well as variations in the body's electrical properties. A poor crossbody link, as can be appreciated, may cause undesired user experiences including communication lag or latency in data streaming while listening to music, gaming, or using other applications. Crossbody communication may use the propagation of creeping waves to transmit signals between electronic devices.

The embodiments described herein may provide a miniaturized, low-profile, wearable antenna that is capable of exciting strong creeping waves and providing a correspondingly strong crossbody link. Indeed, these embodiments may include multiple distributed, short, vertically polarized monopole antennas with a significant reduction in the overall height of the antenna (e.g., from 10 mm in height to 1.5 mm in the case of ultra-wideband channel 9 antennas). Using these much shorter, vertically polarized distributed monopole antennas, the embodiments described herein may be able to more easily fit into compact wearable devices, while still maintaining the performance of single vertical monopole antennas, including an ability to excite creeping waves.

The distributed monopole antennas described herein may thus provide improved cross-body links (e.g., improvements of 10-30 dB over patch antennas, which is also a vertical polarized and low-profile antenna). The distributed monopole antenna may also include a systematic structure that substantially eliminates orientation dependencies when exciting the creeping waves. Still further, the distributed monopole antennas' directivity may be reduced by 2 dB or more as compared to patch antennas having comparable efficiency. This reduction in directivity may be desirable as the conducted power may be capped by effective isotropic radiated power (EIRP) constraints. A reduced-directivity antenna may allow higher conducted power for higher total radiated power (TRP). Moreover, the antenna bandwidth of a distributed monopole antenna may be equal to or better than a patch antenna, and the size may be similar to or smaller than a patch antenna. As such, during the manufacturing process, the distributed monopole antenna may introduce little to no added integration cost.

Accordingly, the embodiments described herein may thus provide robust cross-body antenna performance (e.g., improved S21 (insertion loss) and an improved received signal strength indicator (RSSI) for the overall system). This improved insertion loss and RSSI may occur regardless of antenna polarization or orientation and regardless of the antenna's placement relative to the position of the user's body. Still further, the embodiments herein may reduce antenna directivity (which may be EIRP constrained) and may be robust against metallic surroundings that are near the antenna (e.g., printed circuit boards (PCBs), thermal sheets, etc.). Additional performance details regarding these embodiments are shown in the charts of FIGS. 3A-3D.

Figure 3A:
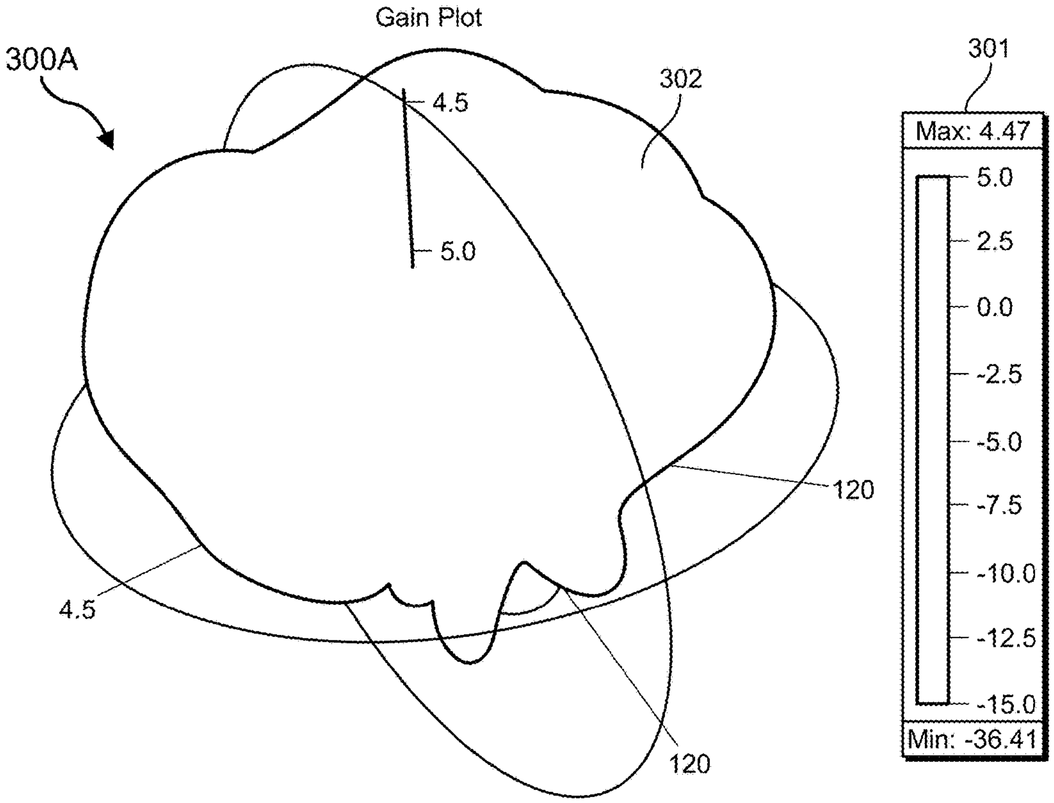
FIGS. 3A-3D are illustrations of example antenna performance charts showing various types of performance for a distributed monopole antenna in comparison with a patch antenna.
Figure 3B:
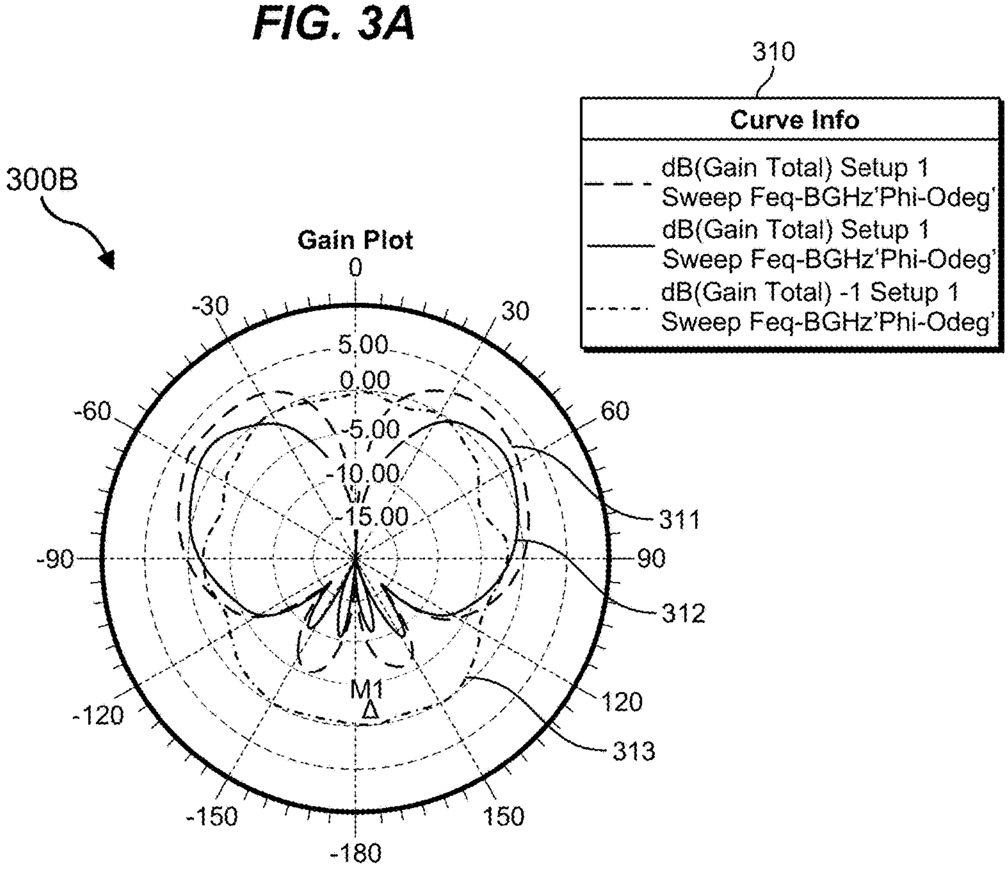

Embodiment 300A of FIG. 3A, for example, illustrates a gain plot 302 that shows the amount of gain achieved by a distributed monopole antenna such as 100 of FIG. 1 or 200 of FIG. 2. The gain plot 302 indicates the vertical polarity of the antenna, with smaller gains (according to chart 301) running vertically and larger gains running horizontally in a circumferential manner relative to the antenna. Embodiment 300B of FIG. 3B shows an alternative gain plot that, according to key 310, shows a total gain 311 at 8 GHz, a Phi=90 deg gain total 312 at 8 GHz, and a Theta=90 deg gain total 313 at 8 GHz. As can be seen, these gain patterns advantageously show low directivity measurements. This low directivity may help improve cross-body links between HMDs and controllers, for example, or between HMDs and smartwatches or other electronic devices.

Figure 3C:
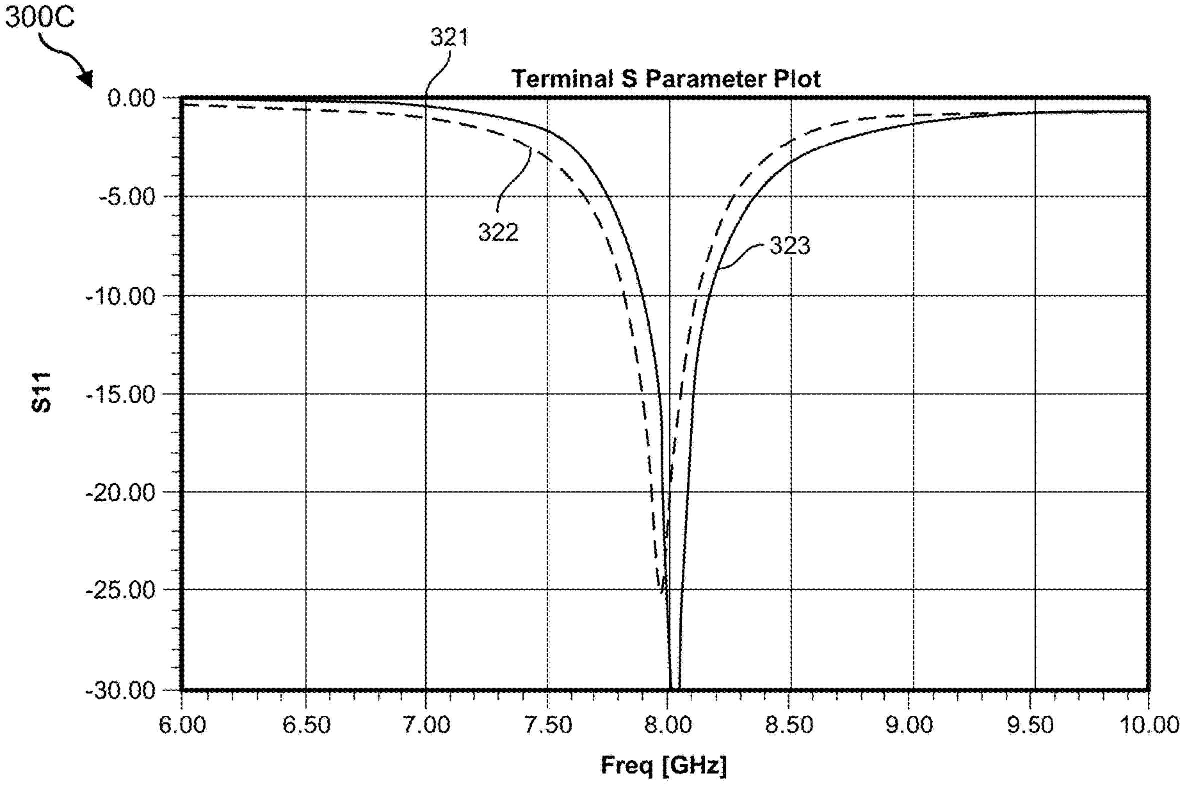
Figure 3D:
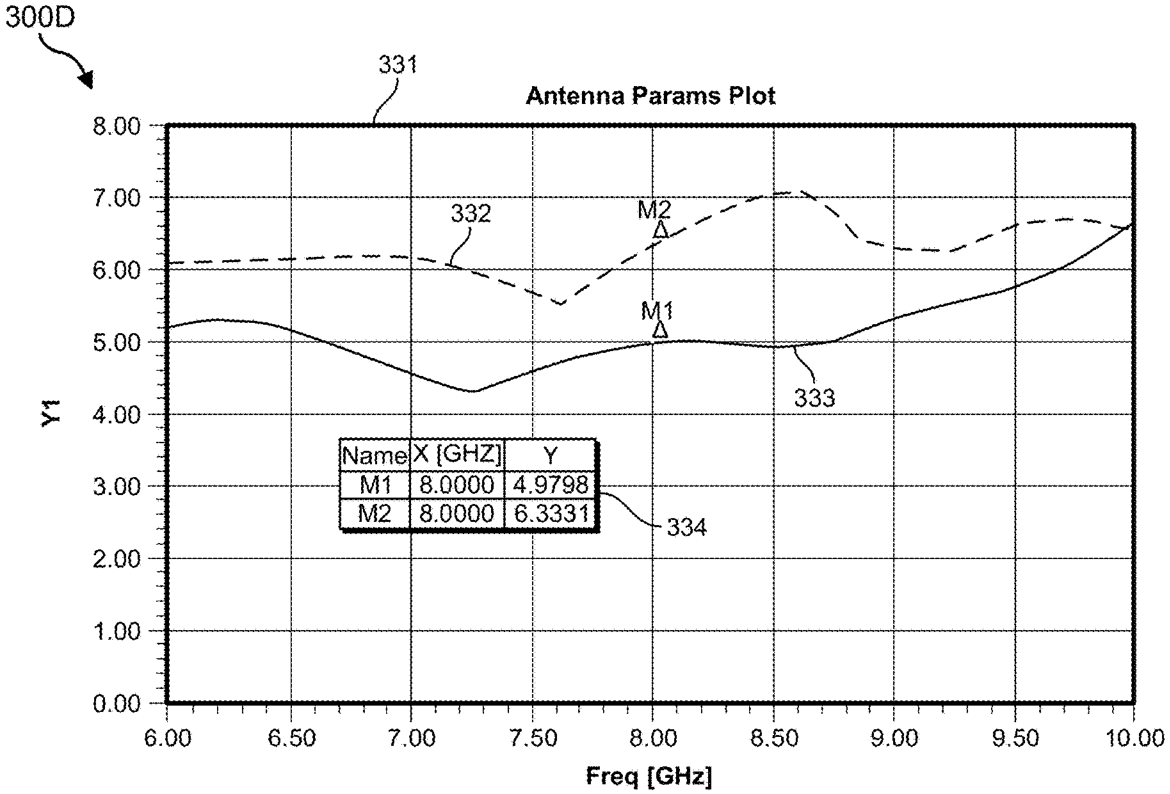

Embodiment 300C of FIG. 3C illustrates a chart 321 that shows, on the x-axis, a range of frequencies between 6 GHz and 10 GHz and, on the y-axis, an S11 measure of the amount of signal loss that occurs at different frequencies for a distributed monopole antenna 323 and for a patch antenna 322. Both the patch antenna and the distributed monopole may be well matched and may have a similar bandwidth. Embodiment 300D of FIG. 3D illustrates a chart 331 that shows, on the x-axis, a range of frequencies between 6 GHz and 10 GHz and, on the y-axis, a directivity between 0 and 8.0 dBi. As can be seen, the distributed monopole antenna 333 shows a lower directivity value than the patch antenna 332 across the frequencies between 6.0 GHz and 9.9 GHz. At least in some cases, these parameters may change based on the characteristics of the distributed monopole antenna including the number and/or size of the conductive vias that connect the conductive plates of the distributed monopole antenna.

Figure 4A:
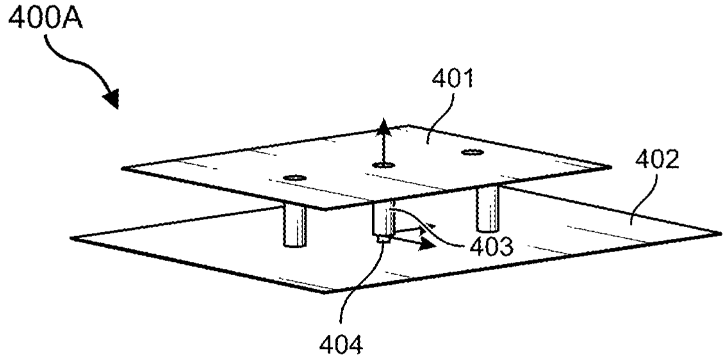
FIGS. 4A-4C are illustrations of different embodiments of a distributed monopole antenna.
Figure 4B:
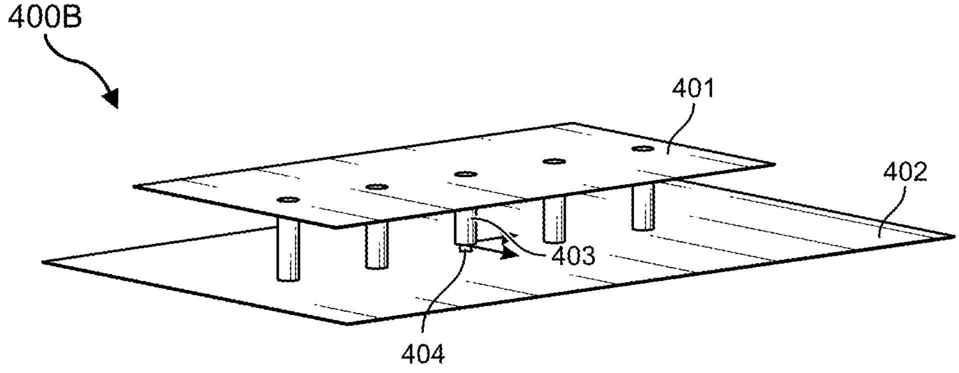
Figure 4C:
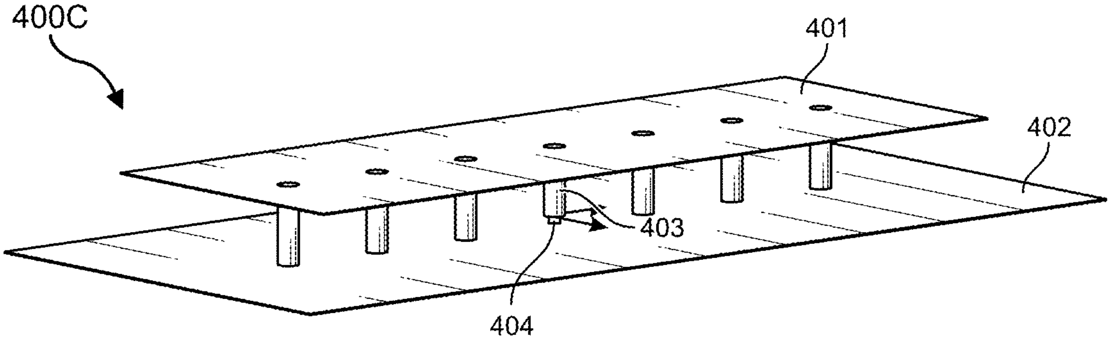

For example, as shown in FIGS. 4A-4C, different numbers of conductive vias may be used in a distributed monopole antenna. In FIG. 4A, for instance, a distributed monopole antenna 400A may include a first conductive plate 401 and a second conductive plate 402. The two conductive plates 401/402 may be electrically connected with, in this case, three vias 403. In some examples, the vias 403 may be arranged in the shape of a line. In some cases, the line of vias may be a series of connected cells, where each cell has top and bottom conductive plate portions and a conductive via that electrically connects the top and bottom conductive plate portions. In such cases, the antenna cells may be fused or melded together to form a line-shaped distributed monopole antenna 400A. In some examples, the cell size and/or the radius of the vias may determine the operating frequency of the distributed monopole antenna 400A. For at least some embodiments of the distributed monopole antenna described herein, the input currents to each of the adjacent cells may be in phase at the antenna's operating frequencies. In this manner, the adjacent cells may operate as a single unit to radiate at the operating frequency.

In this embodiment, one of the conductive vias 403 (e.g., the middle via) may include or may be connected to an antenna feed 404. In some cases, the antenna feed 404 may be connected to any of the vias 403 in the line of vias. The antenna feed 404 may itself be connected to other antenna feed components including impedance matching circuits, amplifiers, tuners, signal processors, or other electronic components. These electronic components may be disposed on a printed circuit board or other substrate. Distributed monopole antennas that include fewer conductive vias 403, such as monopole antenna 400A, may be smaller in size and may thus fit into devices or form factors that larger antennas may not fit into. Moreover, smaller, line-shaped distributed monopole antennas may have narrower bandwidth and less efficiency, but may advantageously exhibit less directivity than larger antennas.

FIGS. 4B and 4C illustrate embodiments in which a line-shaped distributed monopole antenna 400B/400C may include five or seven conductive vias 403, respectively. While other numbers of vias are possible, including even numbers of vias, it will be understood that as the distributed monopole antenna becomes larger, it may gain wider bandwidth and may increase in efficiency, but may experience greater directivity and may become too large for certain form factors. Still further, it should be noted that the spacing of the vias may be altered to change the operating frequency of the distributed monopole antenna. As such, in some cases, the conductive vias 403 may be spaced closer together, while in other cases, the vias may be spaced further apart to cause operation at different frequencies. In some cases, each of the vias may be separated from the other vias by at least a specified minimum or maximum amount. Still further, the diameter of the vias may be additionally or alternatively changed to alter the operating frequency of the distributed monopole antenna 400A-C. In some embodiments, the conductive vias may have a diameter that is above a minimum diameter or is below a specified maximum diameter in order to cause operation at a specified frequency.

Figure 5A:
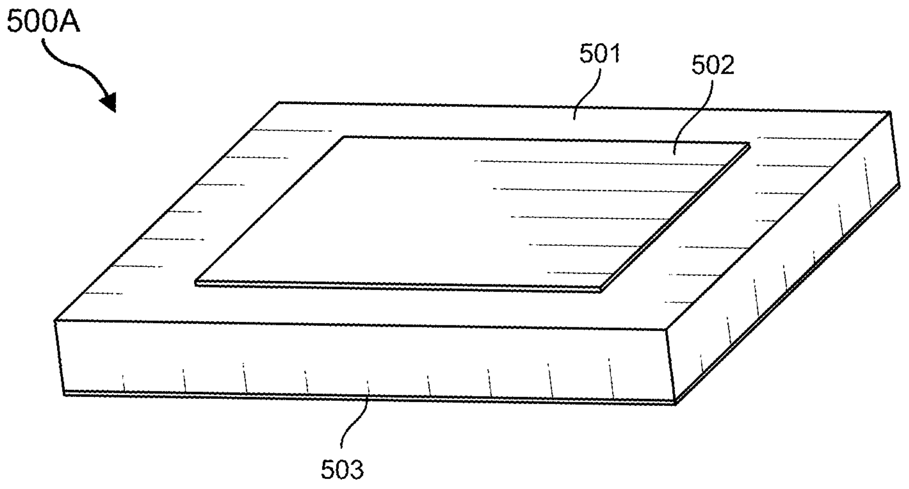
FIGS. 5A-5C are illustrations of alternative embodiments of a distributed monopole antenna.
Figure 5B:
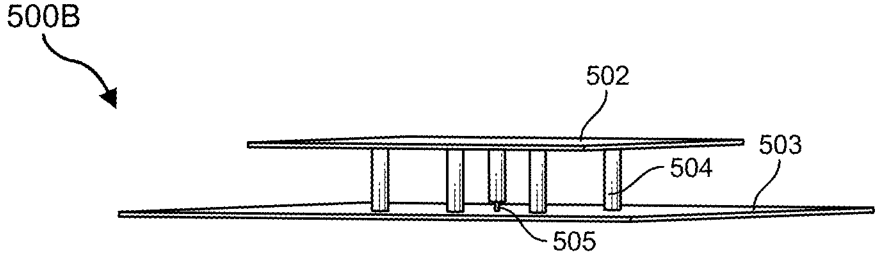
Figure 5C:
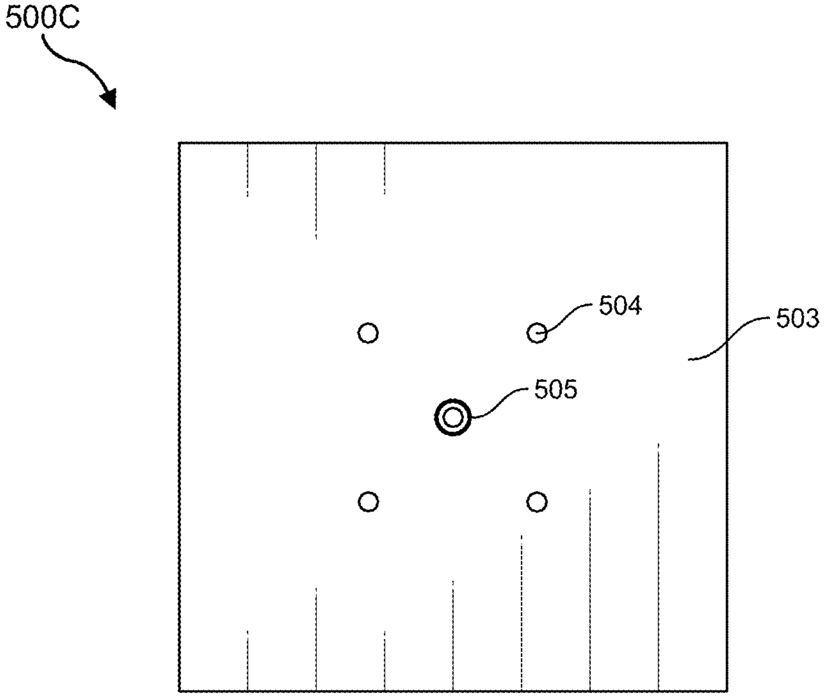

FIGS. 5A-C illustrate embodiments of a distributed monopole antenna 500A that includes multiple vias arranged in an alternative pattern. Indeed, as shown in FIG. 5A, the distributed monopole antenna 500A may include a top conductive plate 502 and a bottom conductive plate 503. These two conductive plates 502/503 may be embedded in a substrate 501 such as silicon or plastic. As shown in embodiment 500B of FIG. 5B, the distributed monopole antenna may include four vias 504 arranged in a square pattern between the top conductive plate 502 and the bottom conductive plate 503. In this embodiment, an antenna feed 505 may be connected to a fifth, center via that is centered within the four vias arranged in the square pattern. This can be seen in embodiment 500C of FIG. 5C, where four vias 504 are arranged in a square pattern on the bottom conductive plate 503. A fifth via may be centered between the four surrounding vias 504, and may be electrically connected to an antenna feed 505. The antenna feed 505 may be configured to transfer power to the conductive vias 504 that electrically connect the top conductive plate 502 to the bottom conductive plate 503. This transfer of power may cause emission of radio waves that excite creeping waves in a user's body. These creeping waves may travel through at least a portion of the user's body to a second antenna, for example, in handheld controller or in a smartwatch or other electronic device.

The square-shaped embodiment of FIGS. 5A-5C in which the conductive vias 504 are arranged in a square pattern (e.g., in a 2×2 array or in a 3×3 array), with a fifth, centered via that functions as or is connected to an antenna feed 505, may exhibit specific properties. For instance, this embodiment may exhibit reduced directivity when compared to a patch antenna or other similar antenna. This reduced directivity may allow the distributed monopole antenna to function more efficient in environments where communication between antennas occurs at least partially through a user's body. And, more specifically, this reduction in directivity may provide maximized transmission efficiency, especially in situations where the antenna (and the feed behind the antenna) are constrained by effective isotropic radiated power (EIRP) limits that restrict the amount of power that can be applied to the antenna when placed close to a user's body. Still further, the embodiment of FIGS. 5A-5C may continue to function properly even if placed next to printed circuit boards or thermal sheets or other objects that may otherwise impede wireless transmission. And, because this embodiment is particularly good at exciting creeping waves within a user's body, the distributed monopole antenna 500A may be implemented to establish and maintain strong cross-body links (e.g., between HMDs and controllers, phones, smartwatches, or tethered computing devices).

Figure 6A:
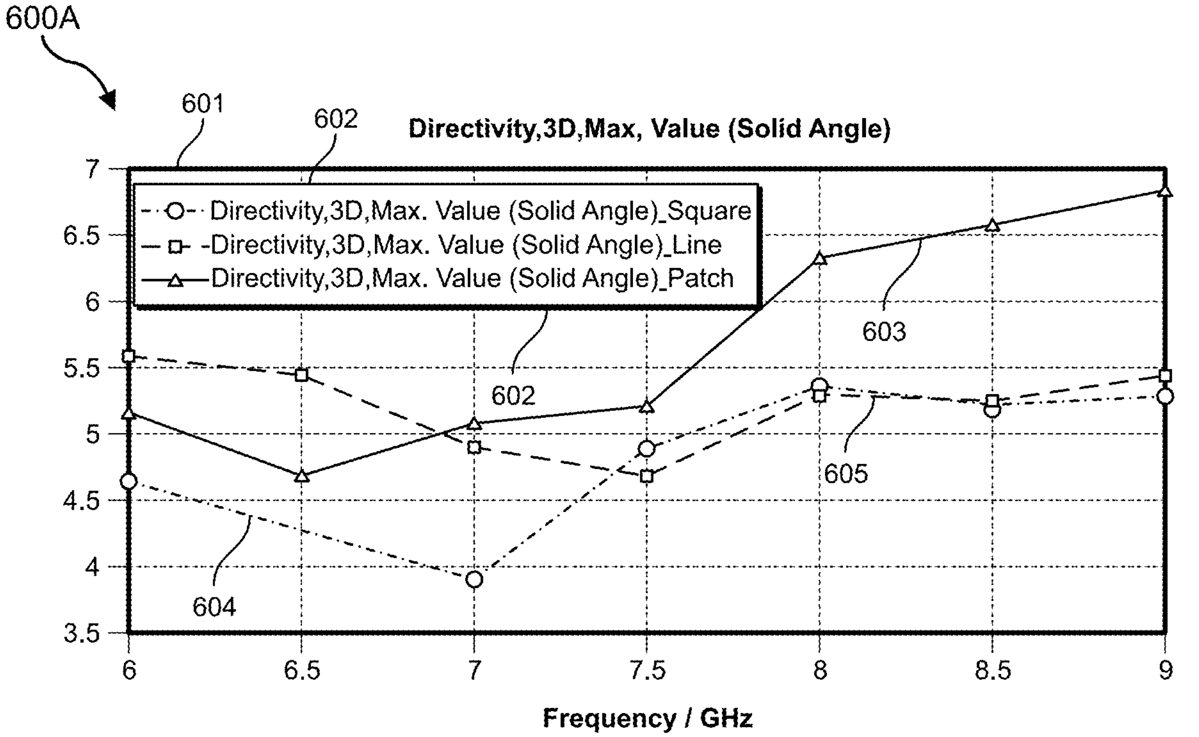
FIGS. 6A-6E are illustrations of example antenna performance charts showing various types of performance comparisons for different types of antennas.
Figure 6B:
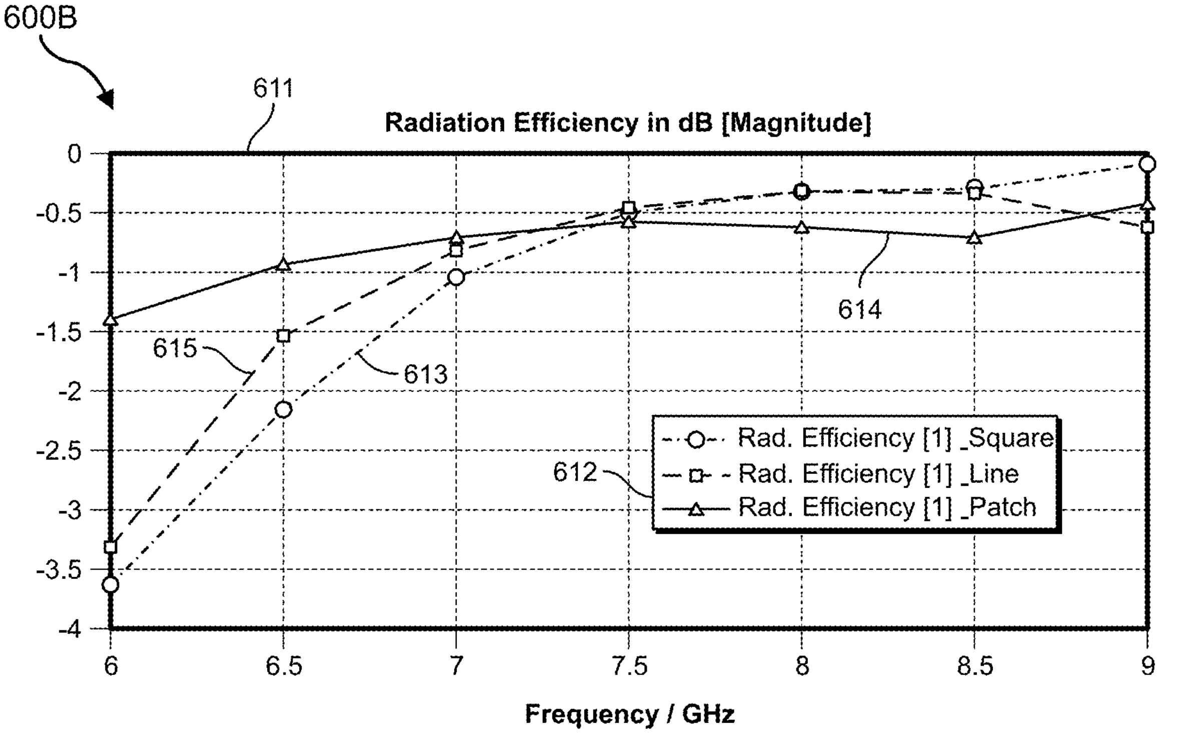

FIGS. 6A-6E illustrate charts that highlight differences in directivity, efficiency, and measurements of return loss (e.g., S11) and insertion loss (e.g., S21). For instance, FIG. 6A illustrates an embodiment 600A of a chart 601. The chart shows directivity measurements for three different antennas according to key 602: a square-shaped distributed monopole antenna (e.g., similar to that of FIGS. 5A-5C) 604, a line-shaped distributed monopole antenna (e.g., similar to that of FIG. 1, 2, or 4A-4C) 605, or a patch antenna 603. As can be seen in the chart 601, the line- and square-shaped antennas 605 and 604 advantageously exhibit lower directivity, while the patch antenna 603 exhibits higher directivity. Because of the lower directivity, the line and square antennas may operate using more total input power, which may increase total radiated power (TRP) while maintaining a similar efficiency, as shown in chart 611 of FIG. 6B.

Figure 6C:
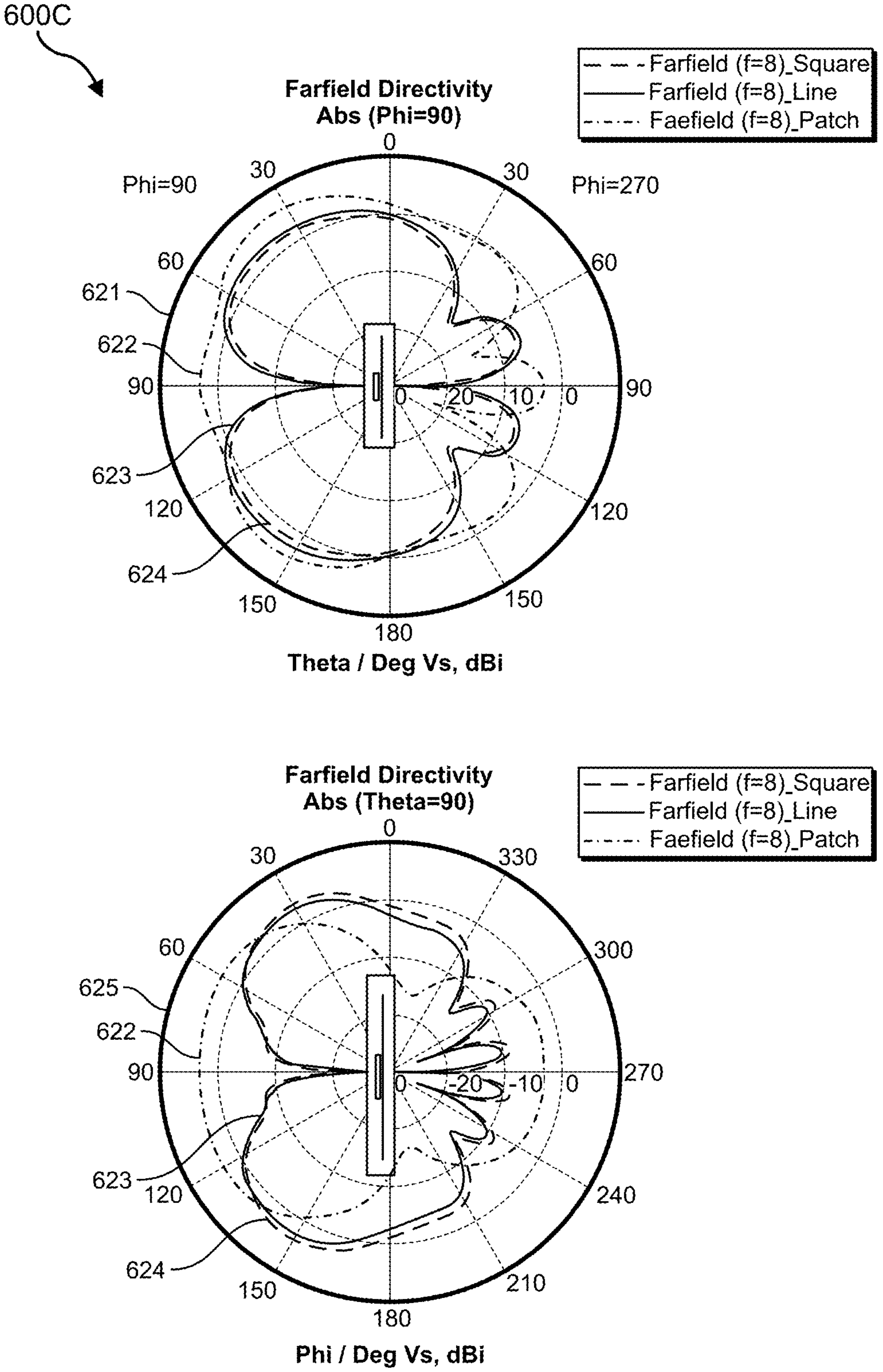
Figure 6D:
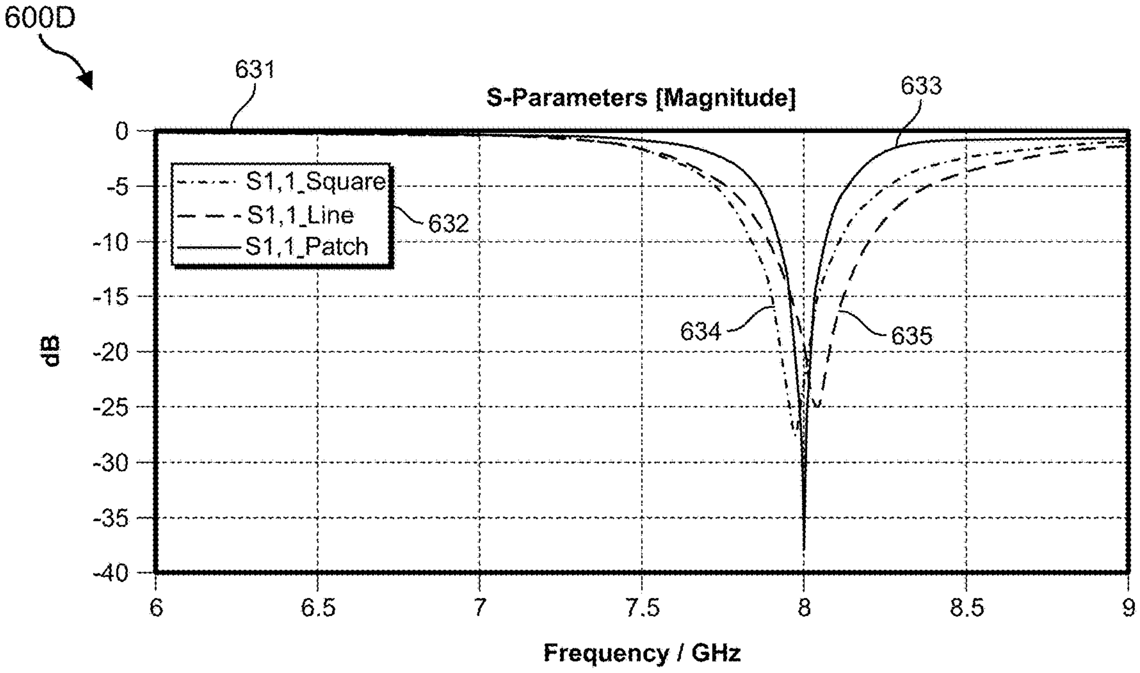
Figure 6E:
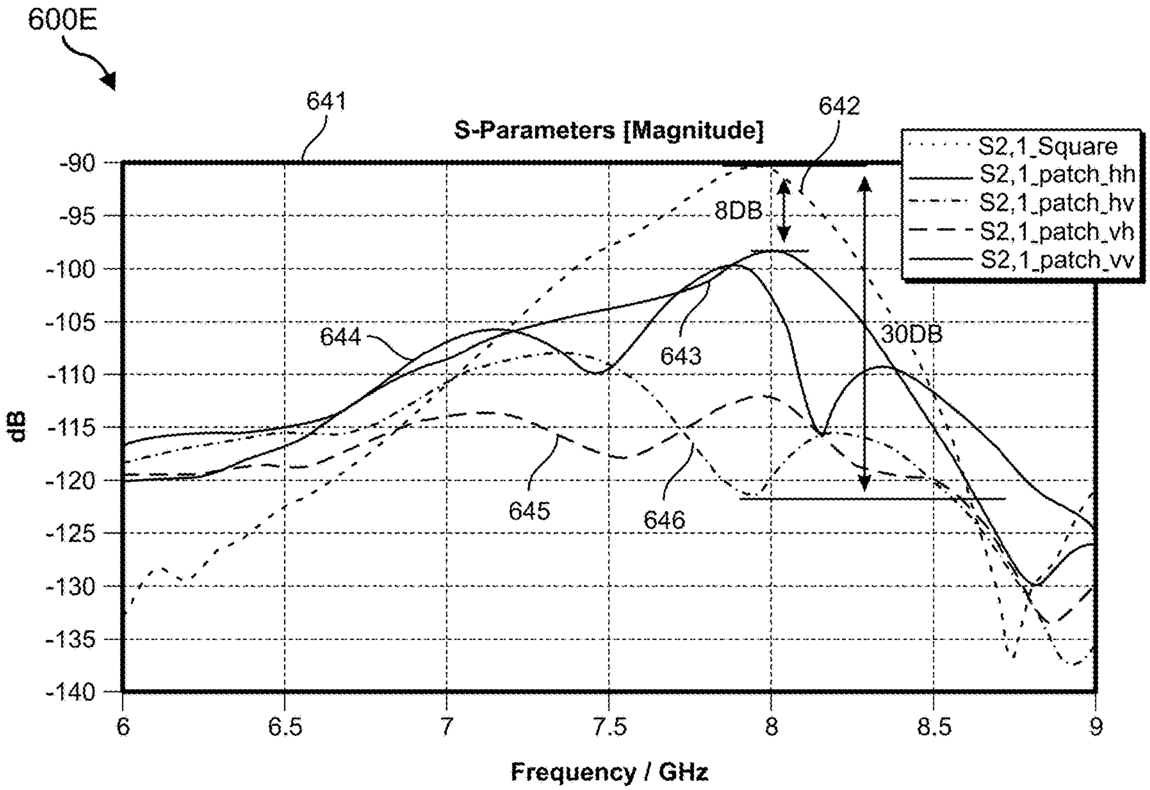

Embodiment 600C of FIG. 6C shows radiation pattern 621 and 625. These directivity charts 621 and 625 illustrate directivity measurements for three different antennas: a patch antenna 622, a line-shaped distributed monopole antenna 623, and a square-shaped distributed monopole antenna 624. Chart 621 illustrates far field radiation pattern measurements at Phi=90, while chart 625 illustrates far field directivity measurements at Theta=90. Both charts indicate improved side- and rear-facing performance for the line-shaped and square-shaped distributed monopole antennas 623 and 624, respectively. Embodiment 600D of FIG. 6D shows a chart 631 indicating return loss measurements for the same three antennas, according to key 632. The S11 return loss for the patch antenna 633 may, at least in some cases, be lower than that of the square-shaped antenna 634 or the line-shaped distributed monopole antenna 635. And, when compared to other patch antennas in embodiment 600E of FIG. 6E, the square-shaped distributed monopole antenna 642 in chart 641 may exhibit a wider bandwidth over different types of patch antennas (643-646).

Figure 7:
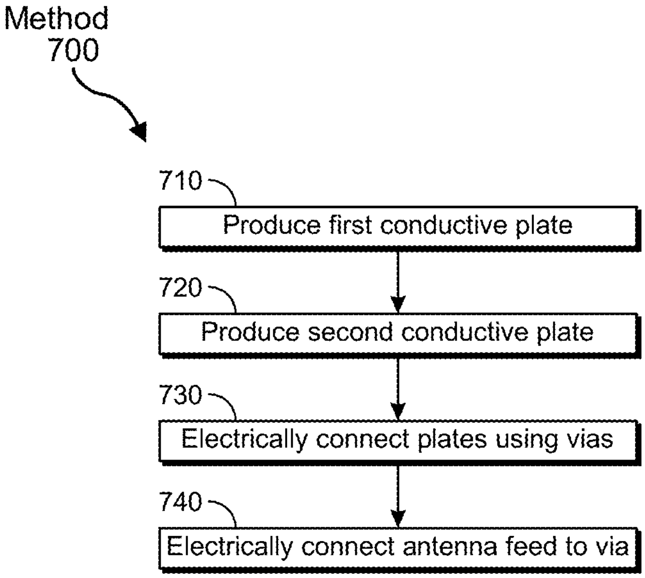
FIG. 7 is a flow diagram of an exemplary method of manufacturing a distributed monopole antenna.

FIG. 7 is a flow diagram of an exemplary method of manufacturing 700 for manufacturing or producing a distributed monopole antenna and/or producing a mobile electronic device that implements a distributed monopole antenna. The steps shown in FIG. 7 may be performed by any suitable manufacturing equipment and/or computer-executable code or computing system, including the systems described herein.

As illustrated in FIG. 7, one or more of the systems described herein may manufacture or otherwise produce a distributed monopole antenna. The method of manufacturing 700 may include producing, at step 710, a first conductive plate, and producing, at step 720, a second conductive plate. Method of manufacturing 700 may next include, at step 730, electrically connecting the first conductive plate to the second conductive plate (e.g., connecting a top conductive plate to a bottom conductive plate) using multiple different conductive vias. Then, at step 740, the method may include electrically connecting an antenna feed to at least one of the vias.

As noted above, the conductive vias may be positioned substantially anywhere between the conductive plates. Moreover, the manufactured distributed monopole antenna may include substantially any number of conductive vias. The conductive vias may be of the same diameter, or different diameters, and may be equally spaced from each other, or may be closer together or further apart. At least one of the conductive vias may be connected to an antenna feed and associated electronic circuitry. In some embodiments, the resulting distributed monopole antenna may be incorporated into a mobile electronic device such as a virtual reality HMD, augmented reality glasses, handheld controllers, smartwatches, smartphones, tablets, or other mobile computing devices. In this manner, distributed monopole antennas may be manufactured and implemented in a variety of different scenarios and, more particularly, in scenarios where a strong cross-body link is to be established and maintained, and where large vertical monopole antennas are unfeasible.

Example Embodiments

Example 1: A system may be provided that includes: a first conductive plate, a second conductive plate, a plurality of vias that electrically connect the first conductive plate to the second conductive plate, and an antenna feed electrically connected to at least one of the vias.

Example 2: The system of example 1, wherein the plurality of vias is arranged in a line, and wherein each of the vias is separated from the other vias by at least a specified amount.

Example 3: The system of examples 1 or 2, wherein the antenna feed is connectable to any of the plurality of vias in the line of vias.

Example 4: The system of any of examples 1-3, wherein line of vias comprises at least one of a 1×5 array of vias or a 1×7 array of vias.

Example 5: The system of any of examples 1-4, wherein the line of vias comprises a series of connected cells, each cell including first and second conductive plate portions and a via that electrically connects the first and second conductive plate portions.

Example 6: The system of any of examples 1-5, wherein at least one of the plurality of vias has a diameter below a specified maximum diameter.

Example 7: The system of any of examples 1-6, wherein the plurality of vias comprises four vias arranged in a square pattern between the first conductive plate and the second conductive plate.

Example 8: The system of any of examples 1-7, wherein the antenna feed is connected to a fifth center via that is centered within the four vias arranged in the square pattern.

Example 9: The system of any of examples 1-8, wherein the antenna feed transfers power to the plurality of vias that electrically connect the first conductive plate to the second conductive plate, causing emission of radio waves that excite one or more creeping waves in a user's body.

Example 10: The system of any of examples 1-9, wherein the creeping waves travel through at least a portion of the user's body to a second antenna.

Example 11: The system of any of examples 1-10, wherein the antenna feed comprises one or more electronic antenna feed components.

Example 12: The system of any of examples 1-11, further comprising a printed circuit board, wherein the electronic antenna feed components are disposed on at least a portion of the printed circuit board.

Example 13: A distributed monopole antenna may include a first conductive plate, a second conductive plate, a plurality of vias that electrically connect the first conductive plate to the second conductive plate, and an antenna feed electrically connected to at least one of the vias.

Example 14: The distributed monopole antenna of example 13, wherein the plurality of vias have a specified height that is below a specified maximum height.

Example 15: The distributed monopole antenna of examples 13 or 14, wherein the plurality of vias have a specified diameter that is above a specified minimum diameter.

Example 16: The distributed monopole antenna of any of examples 13-15, wherein the plurality of vias is arranged in a line, and wherein each of the vias is separated from the other vias by at least a specified amount.

Example 17: The distributed monopole antenna of any of examples 13-16, wherein line of vias comprises at least one of a 1×5 array of vias or a 1×7 array of vias.

Example 18: The distributed monopole antenna of any of examples 13-17, wherein the plurality of vias comprises four vias arranged in a square pattern between the first conductive plate and the second conductive plate.

Example 19: The distributed monopole antenna of any of examples 13-18, wherein the antenna feed is connected to a fifth center via that is centered within the four vias arranged in the square pattern.

Example 20: A method of manufacturing may include producing a first conductive plate, producing a second conductive plate, electrically connecting the first conductive plate to the second conductive plate using a plurality of vias, and electrically connecting an antenna feed to at least one of the vias.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
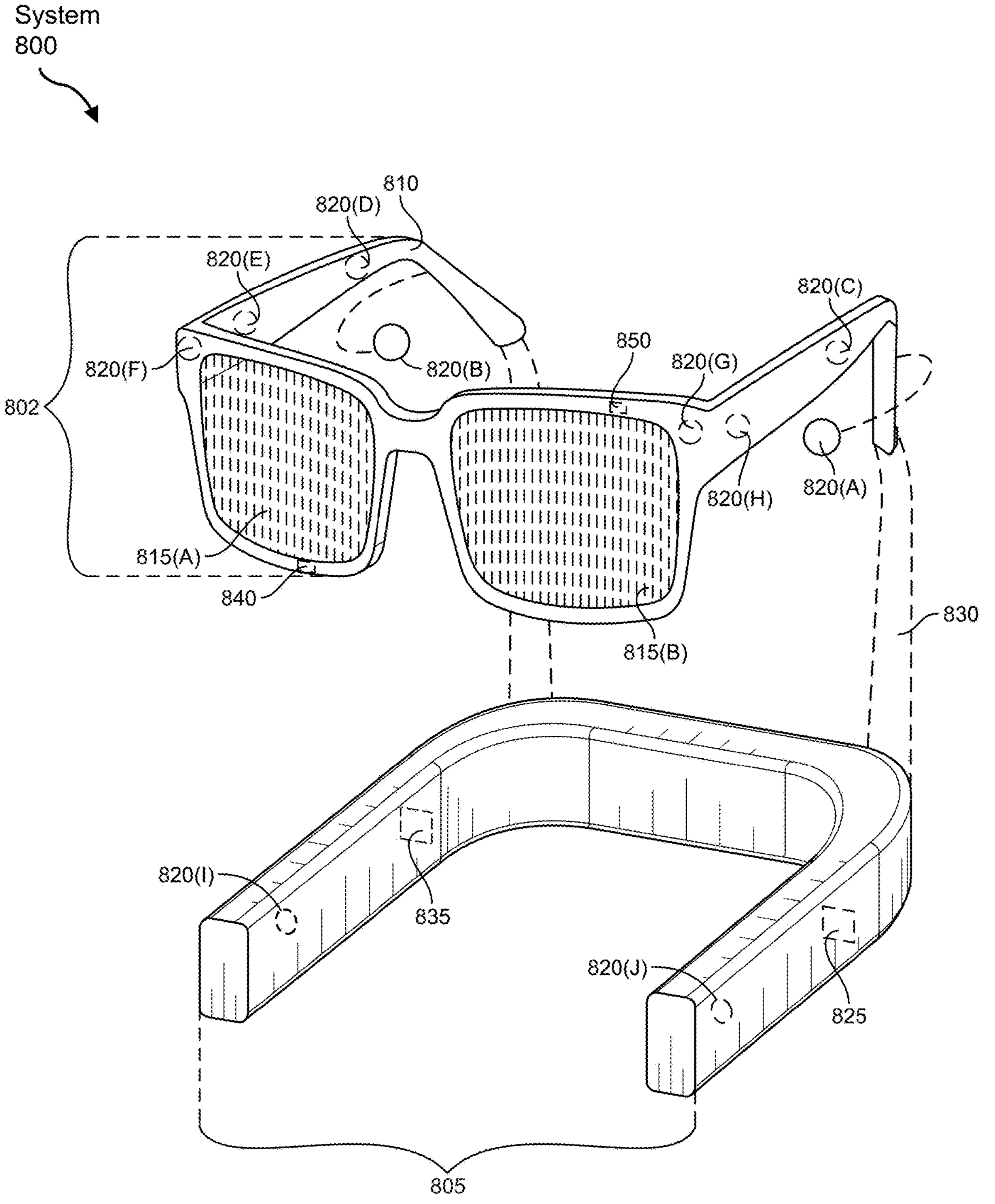
FIG. 8 is an illustration of exemplary augmented-reality glasses that may be used in connection with embodiments of this disclosure.
Figure 9:
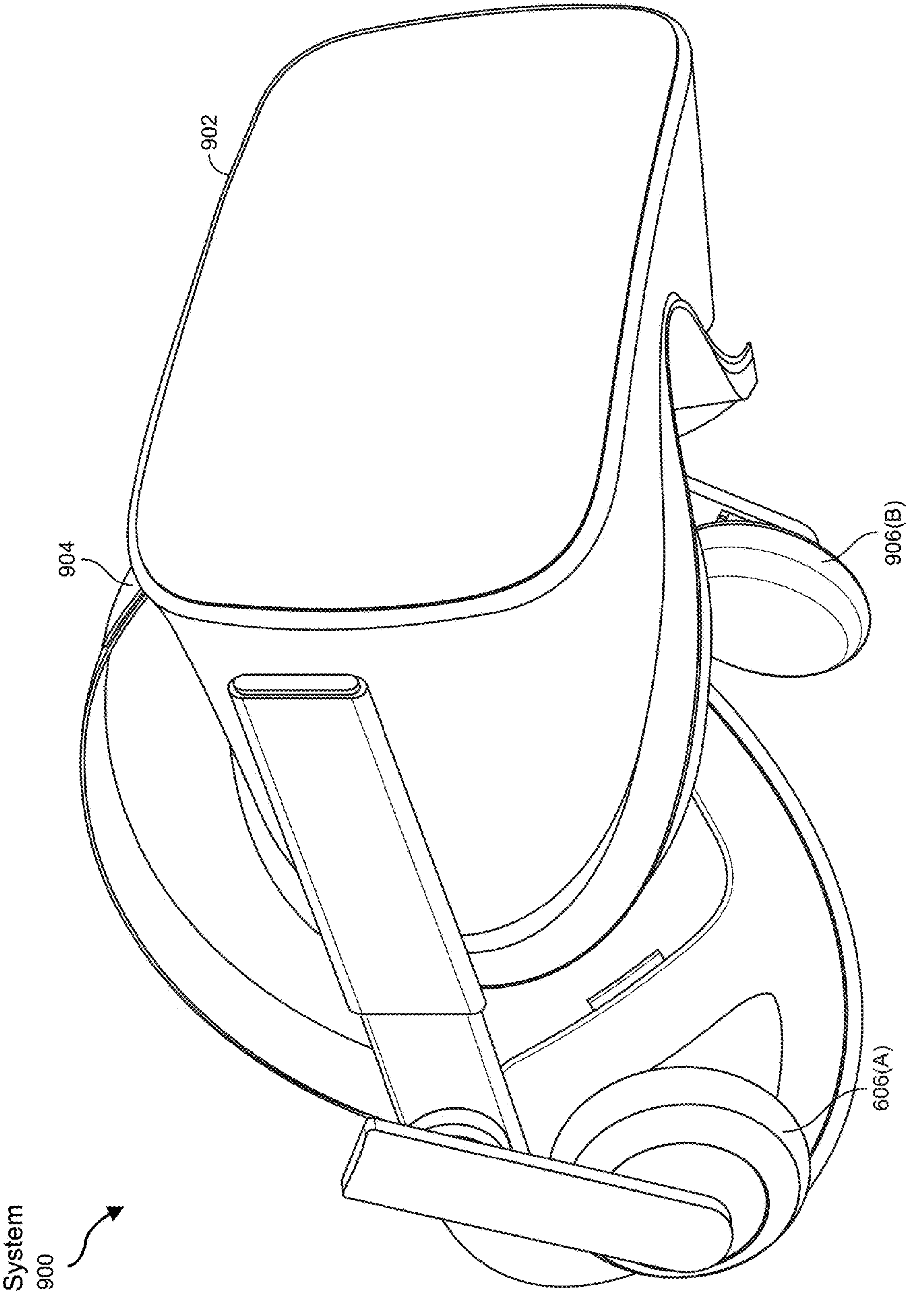
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815 (A) and a right display device 815 (B) in front of a user's eyes. Display devices 815 (A) and 815 (B) may act together or independently to present an image or series of images to a user. While augmented-reality system 800 includes two displays, embodiments of this disclosure may be implemented in augmented-reality systems with a single NED or more than two NEDs.

In some embodiments, augmented reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820 (G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality system 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, handheld controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-ofarrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:

a plurality of connected cells, wherein each cell includes:

a first conductive plate portion;

a second conductive plate portion; and a via that electrically connects the first and second conductive plate portions of the cell, wherein the plurality of connected cells is arranged in a line to form an antenna configured to operate within a specified frequency range tuned based on a specified size of a cell of the plurality of connected cells; and an antenna feed electrically connected to at least one of the vias in the plurality of connected cells.

2. The system of claim 1, wherein the plurality of connected cells is formed at the specified size, wherein the specified size of the plurality of connected cells tunes the antenna for operation within the specified frequency range.

3. The system of claim 1, wherein the antenna feed is electrically connected to the cell of the plurality of connected cells that is formed at the specified size, such that the antenna operates within the specified frequency range.

4. The system of claim 1, wherein the via for one or more of the plurality of connected cells is formed having a specified diameter, and wherein the diameter of the via tunes the antenna for operation within a specified frequency range.

5. The system of claim 4, wherein the antenna feed is electrically connected to at least one of the connected cells that is formed with the via having the specified diameter, such that the antenna operates within the specified frequency range.

6. The system of claim 1, wherein each of the vias is separated from one or more other vias by at least a specified amount.

7. The system of claim 6, wherein the antenna feed is connectable to any of the plurality of vias in the line of vias.

8. The system of claim 6, wherein at least one of the plurality of vias has a diameter below a specified maximum diameter.

9. The system of claim 1, wherein at least one cell of the plurality of connected cells includes four vias arranged in a square pattern between the first conductive plate and the second conductive plate.

10. The system of claim 9, wherein the antenna feed is connected to a fifth, center via that is centered within the four vias arranged in the square pattern.

11. The system of claim 1, wherein the antenna feed transfers power to the plurality of connected cells, causing emission of radio waves that excite one or more creeping waves in a user's body.

12. The system of claim 11, wherein the creeping waves travel through at least a portion of the user's body to a second, receiving antenna.

13. The system of claim 1, wherein the antenna feed comprises one or more electronic antenna feed components.

14. The system of claim 13, further comprising a printed circuit board, wherein the electronic antenna feed components are disposed on at least a portion of the printed circuit board.

15. An electronic device comprising:

a plurality of connected cells, wherein each cell includes:

a first conductive plate portion;

a second conductive plate portion; and a via that electrically connects the first and second conductive plate portions of the cell, wherein the plurality of connected cells is arranged in a line to form an antenna configured to operate within a specified frequency range tuned based on a specified size of a cell of the plurality of connected cells; and an antenna feed electrically connected to at least one of the vias in the plurality of connected cells.

* * * * *